L. D. MAXCORNELL.
UNSEATING DEVICE FOR VALVES.
APPLICATION FILED AUG. 23, 1917.

1,276,391.

Patented Aug. 20, 1918.

WITNESSES
W. E. Fielding
S. M. M. Cole

INVENTOR
Louis D. Maxcornell

BY
ATTORNEY

UNITED STATES PATENT OFFICE.

LOUIS D. MAXCORNELL, OF CHICAGO, ILLINOIS.

UNSEATING DEVICE FOR VALVES.

1,276,391.  Specification of Letters Patent.  Patented Aug. 20, 1918.

Application filed August 23, 1917. Serial No. 187,833.

*To all whom it may concern:*

Be it known that I, LOUIS D. MAXCORNELL, a citizen of the United States, residing at Chicago, in the county of Cook and State of Illinois, have invented certain new and useful Improvements in Unseating Devices for Valves, of which the following is a specification.

This invention relates to check valves, and more particularly to ball valves of this character.

The main object of the invention is to provide simply constructed means operable to quickly unseat a check valve should it for any reason become stuck.

It is well known to those accustomed to steam engines that frequently the check valves become to tightly seated owing to the stoppage of the pump, vacuum, grease or rust, that the automatic pressure fails to unseat them. It then becomes necessary to remove the valve casing head nut and forcibly unseat the valve. This consumes considerable time and is quite laborious. It is to avoid such work that this invention is designed, and which is so constructed that a single push on a pin outside the valve casing will instantly unseat the valve therein, and when pressure on the pin is removed the parts will be automatically restored to normal position.

Another object is to so construct a device of this character that the use thereof will prevent all engine vibration and wearing of packing around the piston pump or valves.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1:
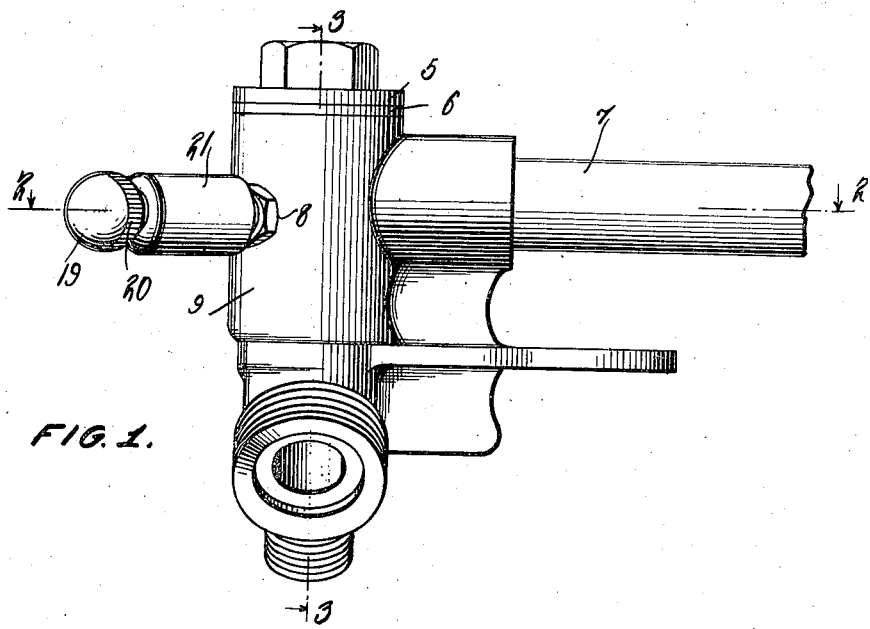
Figure 2:
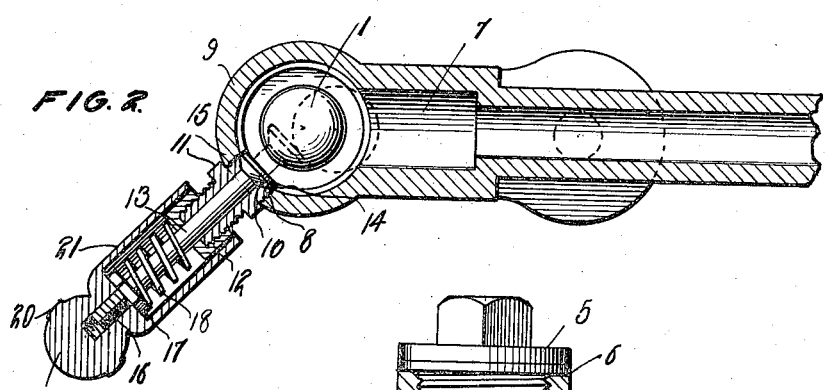
Figure 3:
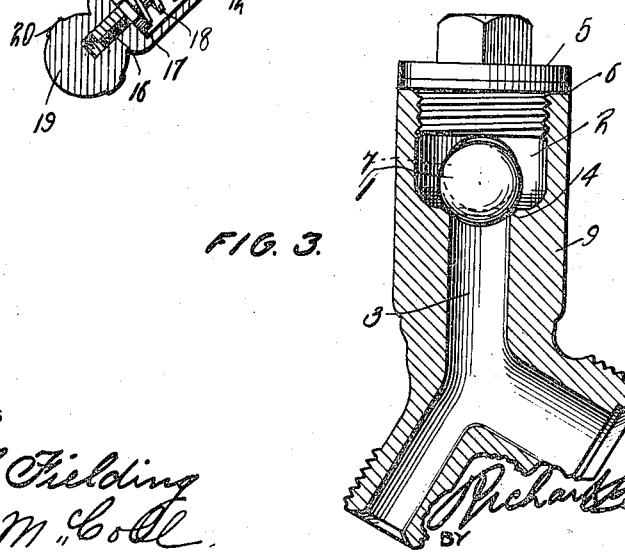

Figure 1 represents a side elevation of a boiler check valve showing this improvement applied, Fig. 2 is a vertical section taken on the line 2—2 of Fig. 1, with the ball valve and plunger shown in dotted lines in the position assumed on the inward movement of the plunger, and Fig. 3 is a vertical section taken on the line 3—3 of Fig. 1.

This invention is here shown embodied in a boiler check valve, although obviously it may be used in connection with any other ball check valve.

An ordinary ball check valve 1 is shown disposed in a chamber 2 formed in a casing 9 and has a passage 3 leading from said chamber and is provided with a valve seat 4 at the outer end thereof where it opens into said chamber. This chamber 2 is closed by the usual head member 5 having a packing 6 between it and the valve casing. A branch pipe 7 opens laterally from the chamber 2 as is shown clearly in Figs. 1 and 2, said pipe being disposed in line with the ball valve 1.

The above described parts constitute the usual boiler check valve which it is not deemed necessary to further describe in detail.

The valve unseating device comprising this invention consists of a tubular member 10 exteriorly threaded at both ends, one of which has threaded engagement with an opening 8 formed in one side wall of the chamber 2. An angular integral collar 11 is carried by this tubular member to facilitate the gripping action of a wrench for applying and removing said member. A nut or cap 12 is secured on the outer end of the member 10 as is shown clearly in Fig. 2 and has an opening therethrough registering with an opening in member 10 through which passes a plunger stem 13 having a cup-shaped head 14 on its inner end which seats on a beveled seat 15 carried by the inner end of member 10. This stem 13 extends through the member 10 and nut 12 and projects some distance beyond them, being threaded at its outer terminal as shown at 16 and on which is adjustably mounted a disk 17 having an angular periphery to facilitate the turning thereof on said stem. Arranged on the stem 13 between the disk 17 and nut 12 is a coiled spring 18 which exerts its tension to hold the plunger-head 14 normally seated.

A device for operating plunger-head 14 against the tension of spring 18 is here shown in the form of a knob 19 having threaded engagement with the outer end of stem 13 and provided with a knurled periphery as shown at 20 to facilitate the turning thereof. A skirt 21 extends longitudinally from the inner end of the knob 19 down over the cap nut 12 and is designed to protect the spring 18 and the parts on the stem between which said spring is mounted as is shown clearly in Fig. 2. It will thus be seen that by pushing the knob 19 inwardly, the plunger stem 13 will be moved inwardly by said knob thereby causing the plunger to forcibly engage the ball valve 1 and unseat said valve and immediately pressure is released on said knob the spring 18 will operate to automatically return the parts to normal position as shown in full lines in Fig. 2. The extent of movement of the plunger may be controlled by the adjustable engagement of the knob 19 with the threaded end of stem 13.

From the above description it will thus be seen that this simply constructed plunger head 14 may be quickly projected to unseat valve 1 by a single pressure on knob 19 thereby avoiding all necessity of unscrewing the head nut 5 to unseat valve 1 should it for any reason become stuck.

It will be understood that the tension of spring 18 may be varied by varying the adjustment of the disk 17 on stem 13 or by varying the position of the cap nut 12 on the tubular member 10.

When for any reason it becomes necessary to repair the parts of the valve unseating device this may be readily done by unscrewing the parts thereof in a manner well known and which it is thought needs no further description.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that such changes may be made as are within the scope of the claimed invention.

I claim:—

The combination with a valve casing having a valve seat with a gravity ball valve movably mounted on said seat, said valve casing having an opening therein opposite said valve, a tubular member exteriorly threaded at both ends with an angular collar between said ends, said member having a seat on its inner end, a cap nut engaged with the outer end of said member and having an opening registering with the bore of said tubular member, a stem movable through said member and nut and having a plunger head on one end for normally engaging said seat, with its outer face, to engage said ball valve when projected, a spring on said stem, a stop adjustable on said stem between which and said cap nut said spring is positioned, the tension of the spring being controlled by said stop, and a plunger actuating knob having threaded and adjustable engagement with said stem and provided at its inner end with a skirt encompassing said spring and cap nut.

In testimony whereof I affix my signature in presence of two witnesses.

LOUIS D. MAXCORNELL

Witnesses:
JAMES PINE,
JOHN J. RYAN.